United States Patent
Im et al.

(10) Patent No.: US 8,642,216 B2
(45) Date of Patent: Feb. 4, 2014

(54) COMPOSITE ANODE ACTIVE MATERIAL, WITH INTERMETALLIC COMPOUND, METHOD OF PREPARING THE SAME, AND ANODE AND LITHIUM BATTERY CONTAINING THE MATERIAL

(75) Inventors: Dong-min Im, Seoul (KR); Han-su Kim, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1133 days.

(21) Appl. No.: 11/966,607

(22) Filed: Dec. 28, 2007

(65) Prior Publication Data

US 2008/0182173 A1    Jul. 31, 2008

(30) Foreign Application Priority Data

Jan. 25, 2007  (KR) .................. 10-2007-0007912
Sep. 11, 2007  (KR) .................. 10-2007-0092148

(51) Int. Cl.
*H01M 4/58*  (2010.01)

(52) U.S. Cl.
USPC .................. 429/231.95; 429/209; 429/218.1

(58) Field of Classification Search
USPC .................. 429/209, 231.95, 218.1
See application file for complete search history.

(56) References Cited

U.S. PATENT DOCUMENTS

| | | | | |
|---|---|---|---|---|
| 4,324,846 | A * | 4/1982 | Kaun et al. | 429/112 |
| 4,446,212 | A * | 5/1984 | Kaun | 429/103 |
| 5,888,430 | A | 3/1999 | Wakayama et al. | |
| 6,090,505 | A | 7/2000 | Shimamura et al. | |
| 6,265,111 | B1 * | 7/2001 | Bito et al. | 429/231.95 |
| 2003/0134198 | A1 | 7/2003 | Sawa et al. | |
| 2004/0053131 | A1 * | 3/2004 | Tanizaki et al. | 429/218.1 |
| 2004/0146734 | A1 | 7/2004 | Miller et al. | |
| 2004/0219432 | A1 | 11/2004 | Kojima et al. | |
| 2004/0258993 | A1 | 12/2004 | Matsuno et al. | |
| 2005/0031957 | A1 * | 2/2005 | Christensen et al. | 429/218.1 |
| 2006/0127773 | A1 * | 6/2006 | Kawakami et al. | 429/245 |
| 2007/0092796 | A1 | 4/2007 | Matsuda et al. | |

FOREIGN PATENT DOCUMENTS

| | | |
|---|---|---|
| CN | 1419303 A | 5/2003 |
| CN | 1534812 A | 10/2004 |
| CN | 1571210 A | 1/2005 |
| JP | 9-249407 | 9/1997 |
| JP | 2001-68112 | 3/2001 |

(Continued)

OTHER PUBLICATIONS

SIPO Office action dated Mar. 3, 2011, for corresponding Chinese Patent application 200810004579.3, with English translation, 7 pages.

SIPO Office action dated Jan. 11, 2012, for corresponding Chinese Patent application 200810004579.3, with English translation, 6 pages.

Japanese Office action dated Jan. 8, 2013, for corresponding Japanese Patent application 2008-015445, (2 pages).

(Continued)

*Primary Examiner* — Zachary Best
(74) *Attorney, Agent, or Firm* — Christie, Parker & Hale, LLP (57) ABSTRACT

A composite anode active material includes a metal that may be alloyed with lithium, an intermetallic compound incapable of alloying with lithium, and a carbonaceous material, wherein the intermetallic compound exists in a phase structurally separated from the metal capable of alloying with lithium. Since the composite active material contains an intermetallic compound that does not form any alloy phase with lithium nor the metal capable of alloying with lithium but rather exists in a structurally separated phase, the composite active material exhibits excellent coulombic efficiency. Further, anode electrodes and lithium batteries including the composite anode active material exhibit improved charge and discharge characteristics.

13 Claims, 5 Drawing Sheets

(56) References Cited

FOREIGN PATENT DOCUMENTS

| | | | |
|---|---|---|---|
| JP | 2001-243946 | | 9/2001 |
| JP | 2004-103478 | | 4/2004 |
| JP | 2004-111202 | | 4/2004 |
| JP | 2004103478 A | * | 4/2004 |
| JP | 2006-339093 | | 12/2006 |
| JP | 2007-502525 | | 2/2007 |

OTHER PUBLICATIONS

Patent Abstracts of Japan, and English machine translation of Japanese Publication 2004-103478 listed above, (37 pages).

SIPO Certificate of Patent dated Nov. 14, 2012, for corresponding Chinese Patent application 200810004579.3, (19 pages).

Patent Abstracts of Japan, and English machine translation of Japanese Publication 2001-243946 listed above, (45 pages).

* cited by examiner

COMPOSITE ANODE ACTIVE MATERIAL, WITH INTERMETALLIC COMPOUND, METHOD OF PREPARING THE SAME, AND ANODE AND LITHIUM BATTERY CONTAINING THE MATERIAL

CROSS-REFERENCE TO RELATED PATENT APPLICATION

This application claims the benefit of and priority to Korean Patent Application No. 10-2007-0007912, filed on Jan. 25, 2007 in the Korean Intellectual Property Office, and Korean Patent Application No. 10-2007-0092148 filed on Sep. 11, 2007 in the Korean Intellectual Property Office, the entire disclosures of which are incorporated herein by reference.

BACKGROUND

1. Field of the Invention

The present invention relates to composite anode active materials, methods of preparing the same, and anodes and lithium batteries containing the anode active materials. More particularly, the invention is directed to composite anode active materials including an intermetallic compound.

2. Description of the Related Art

In an effort to achieve high voltages and energy densities, research and development has been extensively conducted into non-aqueous electrolyte secondary batteries using lithium compounds as anodes. Specifically, metallic lithium has become the subject of intense research due to its ability to impart high initial battery capacity. However, when metallic lithium is used as an anode material, large amount of lithium can deposit on the surface of the anode in the form of dendrites, which may degrade the battery charge and discharge efficiency or cause internal-shorts between the anode and the cathode. Furthermore, lithium is sensitive to heat and impact, and is prone to explosion due to its instability and high reactivity. These problems have tended to limit the commercialization of batteries with metallic lithium. In order to eliminate these problems with the use of metallic lithium, carbonaceous materials have been proposed for use as anode materials. Carbonaceous anodes aid in redox reactions such that lithium ions in an electrolytic solution intercalate/deintercalate in the crystal lattice structure of the carbonaceous material during the charge and discharge cycles. These anodes are referred to as a "rocking chair" type of anodes.

The carbonaceous anode has contributed to the use of lithium batteries by overcoming various disadvantages associated with metallic lithium. However, electronic equipment is becoming smaller and lighter in weight, and the use of portable electronic instruments is becoming more widespread, making the further development of lithium secondary batteries having higher capacities of interest.

Lithium batteries using carbonaceous anodes have low battery capacities because of the porosity of the carbonaceous anodes. For example, graphite, which is a highly crystalline material, when made into a structure in a form of $LiC_6$ by reacting with lithium ions, has a theoretical specific capacity of about 372 mAh/g. This is only about 10% that of metallic lithium, which has a capacity of about 3860 mAh/g. Thus, in spite of many problems with conventional metallic anodes, studies for improving battery capacity using metallic lithium as an anode material are being carried out.

Generally metal and/or metalloid containing materials such as silicon or tin, or a lithium-containing alloys such as lithium-aluminum, lithium-lead, lithium-tin, or lithium-silicon alloys have higher electrical capacities than carbonaceous materials. However, when metals or alloys of two or more metals are used, formation of lithium dendrites is likely to occur. In addition, considerable volume change due to expansion and contraction of the metals can also occur, resulting in poor coulombic efficiency and a reduction in battery cycle life.

One proposed solution to avoid these problems is to use silicon in combination with graphite or other carbonaceous materials. While the lifespan of these batteries increases to a certain extent, their initial charge and discharge efficiencies remain poor. This is because of poor graphitization of the carbonaceous materials. The degree of graphitization is reduced when the edge portions of crystalline surface of the graphite are substantially exposed during the course of mixing silicon with carbonaceous materials. Poor graphitization of carbonaceous materials can result in faster decomposition of the electrolyte during battery charging.

In addition, the use of carbon-based anodes can present further problems. For example, it is difficult to obtain a high degree of graphitization while attaining a silicon composite of carbonaceous material. One proposed solution is to use metallic components instead of a carbonaceous materials in combination with silicon to increase the initial coulombic efficiency. While the use of metallic components may enhance the initial coulombic efficiency, the metals tend to form intermediate phases with lithium, resulting in the same problem of repeated volume expansion and contraction when lithium is introduced and withdrawn from metallic components during battery charge and discharge.

Another proposed solution is to use metallic materials that do not form lithium alloys. However, analysis of binary alloy phase diagrams shows that metallic materials that do not tend to form alloys with lithium form alloys with silicon.

Figure 6:
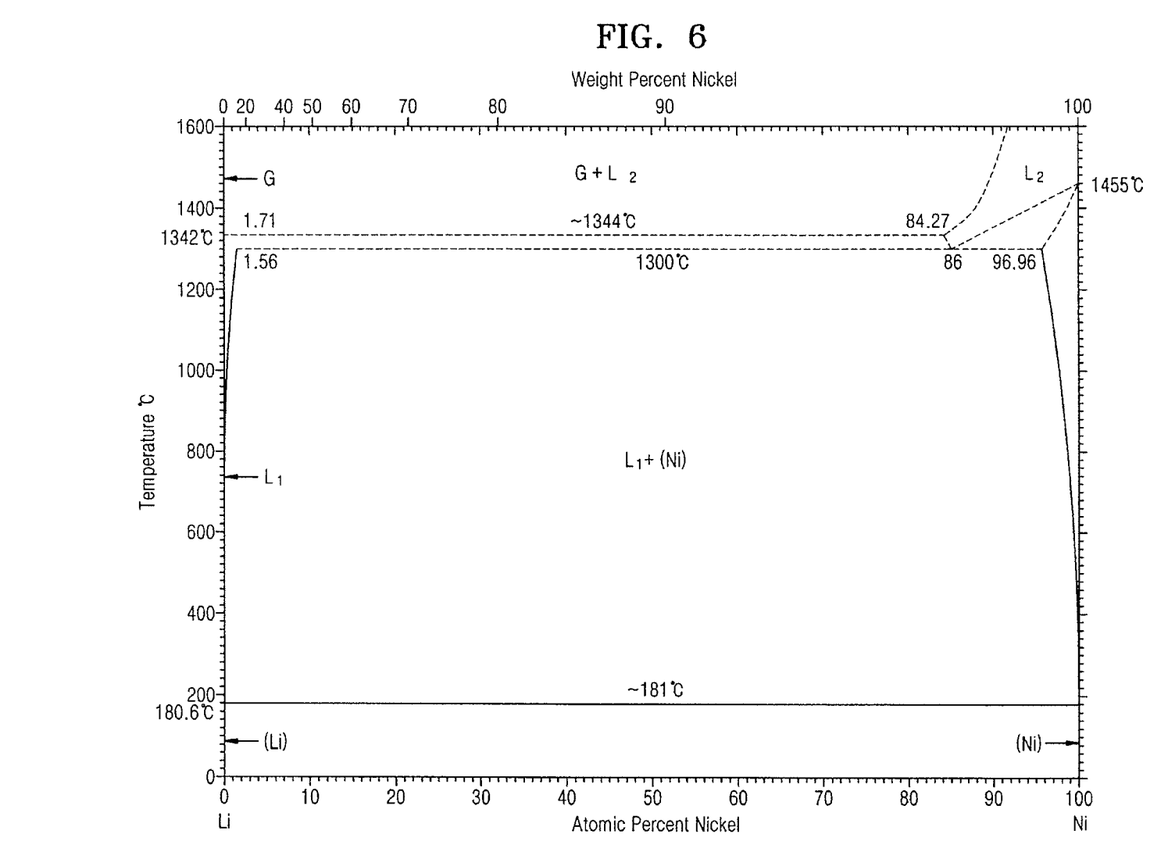
FIGS. 6 and 7 depict phase diagrams of nickel with lithium and silicon, respectively.
Figure 7:
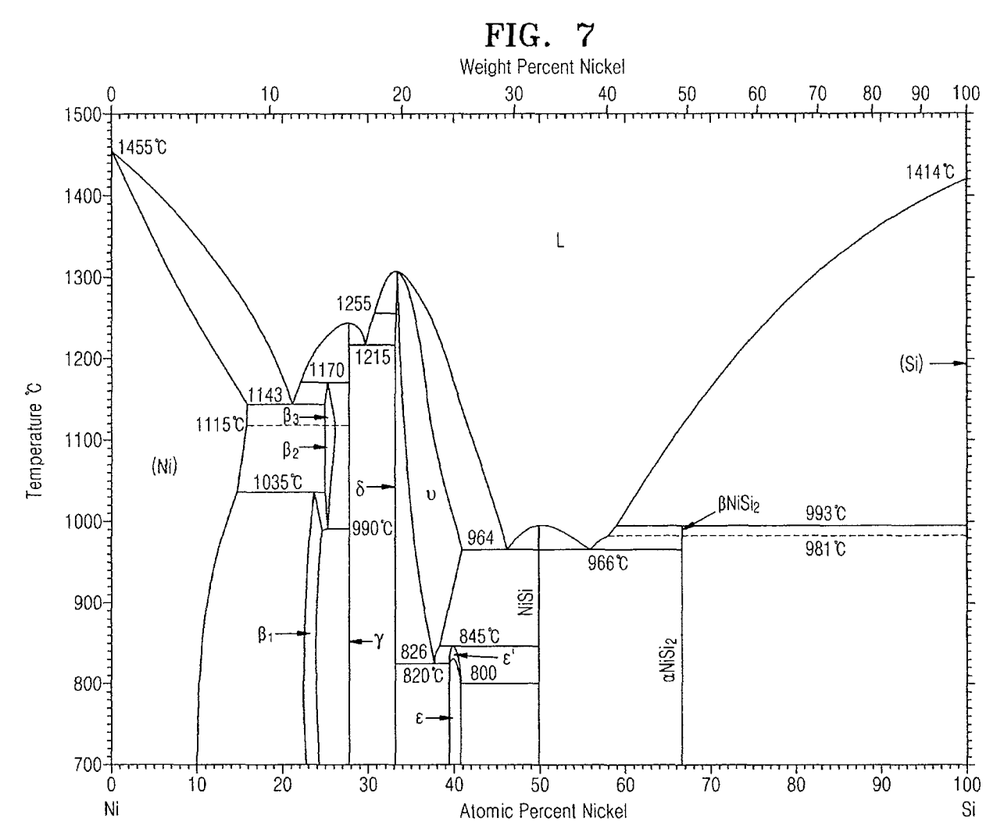

For example, as shown in the phase diagrams of FIGS. 6 and 7, a metallic material such as nickel does not form intermediate phases with lithium. However, it alloys with silicon to form various intermediate phases.

The formation of intermediate phases requiring a consumption of silicon and metallic materials such as nickel, accompanied during the course of mechanical milling or thermal treatment for producing silicon composite, causes a reduction of silicon contents within the composite. Thus, it results in a reduction of battery capacity.

SUMMARY OF THE INVENTION

An embodiment of the present invention is directed toward a composite anode active material including an intermetallic compound.

Another embodiment of the present invention is directed toward a method of preparing the composite anode active material.

Another embodiment of the present invention is directed toward an anode and a lithium battery containing the composite anode active material. An embodiment of the invention is directed to a battery which is capable of improving coulombic efficiency and charge and discharge capacity.

According to an embodiment of the present invention, a composite anode active material includes a metal capable of alloying with lithium; an intermetallic compound incapable of alloying with lithium; and a carbonaceous material, wherein the intermetallic compound exists in a phase structurally separate from the metal capable of alloying with lithium.

According to another embodiment of the present invention, a method of preparing the composite anode active material is provided. The method includes mechanically milling a metal capable of alloying with lithium, an intermetallic compound and a carbonaceous material in an inert atmosphere.

According to another embodiment of the present invention, an anode comprises the composite anode active material. In still another embodiment, a battery includes an anode comprising the composite anode active material.

In one embodiment, the intermetallic compound includes at least two elements selected from the Group III to Group XIV elements and has one or more intermediate phases.

In another embodiment, the intermetallic compound includes a composition having a formula $M_xM_y'$, wherein $0<x<1$, $0<y<1$, $x+y=1$, and M and M' are elements selected from the Group III to Group XIV elements.

Unlike conventional anode active materials, the composite anode active material according to one embodiment of the present invention includes an intermetallic compound forming an alloy phase that exists only in phases structurally separate from the lithium and the metal capable of alloying with lithium, thereby improving initial coulombic efficiency. In addition, according to an embodiment of the invention, the anode and lithium battery including the composite anode active material exhibit excellent charge and discharge characteristics.

DETAILED DESCRIPTION OF THE INVENTION

The present invention will now be described more fully with reference to the accompanying drawings, in which exemplary embodiments of the invention are shown.

A composite anode active material according to the present invention contains a metal capable of alloying with lithium; an intermetallic compound incapable of alloying with lithium; and a carbonaceous material. In one embodiment of the present invention, the intermetallic compound exists in a phase structurally separate from the metal capable of alloying with lithium.

In the present invention, the term "structurally separate" means that a phase of the intermetallic compound in the present invention does not form an alloy phase with the metal capable of alloying with lithium.

X-ray diffraction results indicate that the composite anode active material according to embodiments of the present invention displays peaks for the intermetallic compound and the metal capable of alloying with lithium with no corresponding peaks for their alloy phases. In other words, the intermetallic compound exists only in phases structurally separate from the metal capable of alloying with lithium and exhibits no alloy phase, as measured by X-ray diffraction.

During battery charging, the metal capable of alloying with lithium in the composite anode active material accepts electrons from an external source and at the same time forms an alloy with lithium, storing lithium. Suitable metals capable of alloying with lithium include Si, Ge, Sn, Al, Ag, Au, Pt, Mg, Sb, Pb, Bi, Zn, In, and combinations.

The intermetallic compound prevents the metal capable of alloying with lithium from separating from an external electron passage even when the metal repeatedly expands and contracts. Since the intermetallic compound does not form an alloy with lithium, there is no volume change during the battery charge and discharge cycles. Further, since the intermetallic compound is not alloyed with the metal capable of alloying with lithium, the discharge capacity is not degraded, even after a metal composite is formed.

In one embodiment, the intermetallic compound exists in one or more intermediate phases and each of the solid phases may include at least two elements selected from the Group III to Group XIV elements. In the intermediate phase, the crystal structures are different from the corresponding crystal structures of the individual elements in a single phase. In addition, the crystal structures of the different intermediate phases are different from one another.

According to an embodiment of the present invention, the intermetallic compound may include a compound having at least two elements having a fixed ratio with respect to one another. Such a compound is represented by a vertical line on a phase diagram. According to another embodiment, the compound includes the two elements as having a ratio within a range. Such a compound is represented by an area in a phase diagram.

According to an embodiment of the invention, the intermediate compound may include a compound represented by Formula 1.

$$M_xM_y' \qquad \text{Formula 1}$$

where, $0<x<1$, $0<y<1$, $x+y=1$, and each of M and M' is an element independently selected from the Group III to XIV elements. According to certain embodiments, M may be selected from Ni, Ti, Co, V, and Mo, and M' may be Al.

In certain embodiments, the intermetallic compound includes two elements provided in a fixed ratio to one another. Examples of such compounds include $NiAl_3$, $TiAl_3$, $CO_2Al_9$, $CoAl_3$, $Co_4Al_{13}$, $VAl_3$, $V_5Al_8$ and $MoAl_5$.

In still other embodiments, the intermetallic compound in the intermediate phase may include a compound with the elements in a certain range rather than being in a fixed ratio. More particularly, in embodiments of the invention, the intermetallic compound may include an intermediate phase having a compound with a composition $Ni_xAl_y$, where $0.37<x<0.41$ and $x+y=1$, an intermediate phase having a compound with a composition $Ni_xAl_y$, where $0.45<x<0.59$ and $x+y=1$, an intermediate phase having a compound with a composition $Ni_xAl_y$, where $0.64<x<0.68$ and $x+y=1$, an intermediate phase having a compound with a composition $Ni_xAl_y$, where $0.73<x<0.75$ and $x+y=1$), at 400° C.

In still other embodiments, intermetallic compounds may include an intermediate phase having a compound with a composition $Ti_xAl_y$, where $0.45<x<0.51$ and $x+y=1$, or an intermediate phase having a compound with a composition of $Ti_xAl_y$, where $0.65<x<0.78$ and $x+y=1$, at 500° C.

In another embodiment, an intermediate phase having a constant composition range and including Co, V, and Mo may be in an intermediate phase having a compound with a composition $Co_xAl_y$, where $0.47<x<0.56$ and $x+y=1$ at 200° C., an intermediate phase having a compound with a composition $Mo_xAl_y$, where $0.25<x<0.31$ and $x+y=1$ at 400° C., and an intermediate phase having a compound with a composition $Mo_xAl_y$ where $0.73<x<0.78$ and $x+y=1$ at 400° C.

Further, the intermetallic compound has the same crystal structures in an intermediate phase in spite of differences in chemical compositions.

In certain embodiments, suitable intermetallic compounds include $NiAl_3$, $TiAl_3$, $CO_2Al_9$, $CO_4Al_{13}$, $VAl_3$, and $MoAl_5$. The amounts of the intermetallic compound may be provided in the range of 30 to 90 wt % based on a total weight of the composite anode active material. If the amount of the intermetallic compound is less than 30 wt %, the intermetallic compound may not properly prevent the metal capable of alloying with lithium from separating from the external electron passage when the metal is repeatedly expanded and contracted. If the amount of the intermetallic compound is greater than 90 wt %, the amount of the metal capable of alloying with lithium may be insufficient to achieve high storage capacities.

The carbonaceous material can serve as a pathway for lithium ions in the composite anode active material. In addition, when a composite anode active material is formed by mechanical pulverization, the carbonaceous material can serve as a lubricant to facilitate good mixing. Various kinds of carbonaceous materials can be used in the mixture. Suitable examples of the carbonaceous material include graphite, carbon black, amorphous carbon, and fibrous carbon.

In one embodiment, the amount of the carbonaceous materials is in the range of 5 to 50 wt % based on a total weight of the composite anode active material. If the amount of the carbonaceous material is less than 5 wt %, the carbonaceous material may serve as a pathway for lithium ions in the composite anode active material. If the amount of the carbonaceous material is greater than 50 wt %, the initial coulombic efficiency can be reduced due to decomposition of the electrolyte solution.

According to another embodiment of the present invention, a method of preparing the composite anode active material includes: mechanically milling a metal capable of alloying with lithium, an intermetallic compound, and a carbonaceous material in an inert atmosphere. In one embodiment, the intermetallic compound exists in phases structurally separated from lithium and the metal capable of alloying with lithium. In other words, the intermetallic compound does not form an alloy phase with either lithium or the metal capable of alloying with lithium. In one embodiment, the mechanical milling process forms a composite through repeated steps of pulverization and recombination. Suitable metals and intermetallic compounds, and carbonaceous materials are described above.

In another embodiment of the present invention, an anode is formed from the composite anode active material. In still another embodiment, a lithium battery includes such an anode formed from the composite anode active material.

In an embodiment, an anode is formed from a mixed anode material that may include a composite anode active material and a binder. The binder in one embodiment, possesses a predetermined shape. Alternatively, the anode can be formed by applying the mixed anode material directly onto a current collector made of copper foil, for example.

According to another embodiment of the present invention, the anode composition may be cast on a separate support body from which a film of the porous anode active material can be stripped. The film may then be laminated onto a copper foil current collector to obtain an anode plate.

The anode of the present invention is not limited to the illustrated examples. It is understood that many other modifications may be made within the scope of the invention.

Other embodiments of the present invention are directed to high capacity batteries which generally require low resistance materials for the electrodes to facilitate higher charge and discharge currents. In one embodiment of the invention, a high capacity battery provides low resistance of the electrode by including a conducting agent. Suitable conducting agents include carbon black and fine graphite particles.

In one embodiment, a lithium battery includes an anode as described above. A lithium battery may be prepared in the following manner.

First, a cathode active material, a conducting agent, a binder, and a solvent are mixed to prepare a cathode active material composition. The cathode active material composition is directly coated on a metallic current collector and dried to prepare a cathode electrode. In another embodiment, the cathode active material composition is cast on a separate support body and peeled from the support body as a cathode active material film. Then, the cathode active material film is laminated on the metallic current collector.

Lithium-containing metal oxides may be used as the cathode active materials. Such lithium-containing metal oxides are compounds capable of being oxidized and reduced by deintercalation and intercalation with lithium ions. Examples of lithium-containing metal oxides include, but are not limited to, $LiCoO_2$, $LiMn_xO_{2x}$, $LiNi_{x-1}Mn_xO_{2x}$ (where x=1, 2), and $Ni_{1-x-y}Co_xMn_yO_2$ (where $0 \le x \le 0.5$, and $0 \le y \le 0.5$). Examples further include $LiMn_2O_4$, $LiCoO_2$, $LiNiO_2$, $LiFeO_2$, and $V_2O_5$. In one embodiment, carbon black is used as a conducting agent. Suitable binders include vinylidene fluoride/hexafluoropropylene (HFP) copolymer, polyvinylidene difluoride (PVdF), polyacrylonitrile, polymethacrylate, polytetrafluoroethylene, and/or mixtures of these materials, and a styrene butadiene rubber polymer. Suitable solvents include N-methyl-pyrrolidone, acetone, and water. The amounts of the cathode active material, the conducting agent, the binder, and the solvent are generally known in the art.

According to an embodiment, the battery further includes a separator. Any separator that is commonly used for lithium batteries can be used. In particular, the separator may have low resistance to ion migration in an electrolyte, and excellent electrolyte-retaining abilities. Specific examples of separators include glass fiber, polyester, polyethylene, polypropylene, polytetrafluoroethylene (PTFE), or combinations. Such separators may be provided as a material that can be rolled, and can be a woven or non-woven fabric. Suitable separators include those made of polyethylene, polypropylene or the like. A separator capable of retaining a large amount of an organic electrolytic solution may be used for a lithium-ion polymer battery.

A method of forming a separator includes mixing a polymer resin, a filler, and a solvent to prepare a separator composition. The separator composition is directly coated on an electrode, and then dried to form a separator film. Alternately, the separator composition can be cast onto a separate support, dried, detached from the separate support, and laminated on an upper portion of the electrode to form a separator film.

Any polymer resin that is commonly used for lithium batteries can be used in the current embodiment. Examples of the polymer resin include vinylidenefluoride/hexafluoropropylene copolymer, polyvinylidenefluoride, polyacrylonitrile, polymethylmethacrylate and mixtures.

In the electrolyte solution, suitable solvents include propylene carbonate, ethylene carbonate, fluoroethylene carbonate, diethyl carbonate, ethylmethyl carbonate, methylpropyl carbonate, butylene carbonate, benzonitrile, acetonitrile, tetrahydrofuran, 2-methyltetrahydrofuran, gamma-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethylene glycol, dimethyl ether, and mixtures. The electrolyte may be a lithium salt in an electrolyte solvent, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where each of x and y is independently a natural number), or mixtures.

Figure 5:
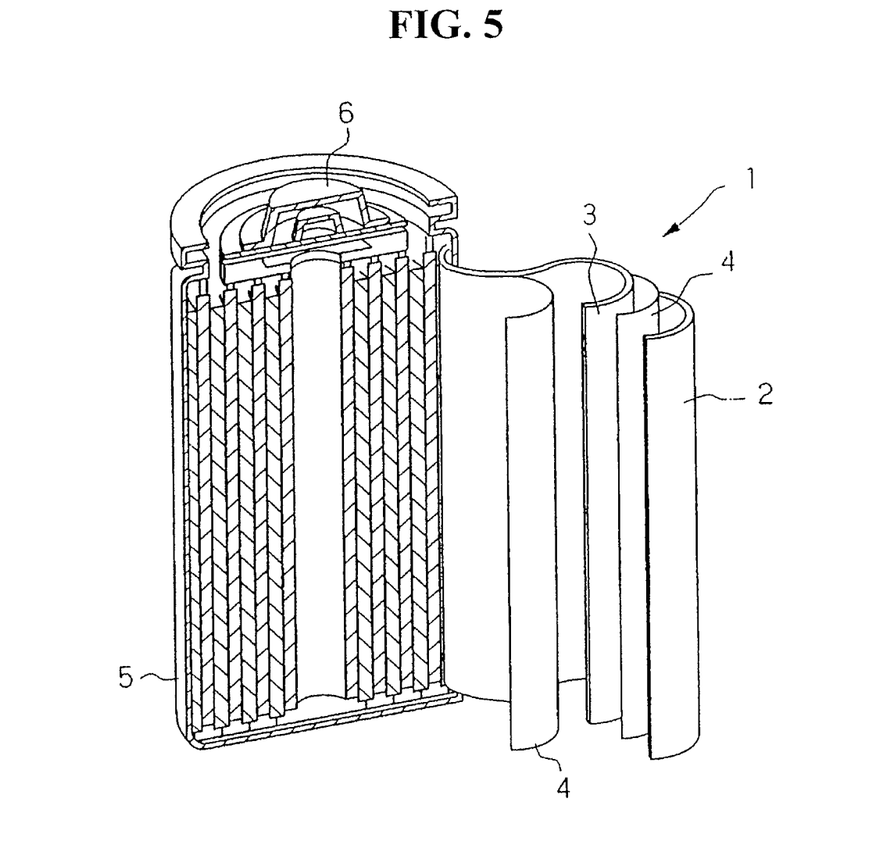
FIG. 5 illustrates a lithium battery prepared according to an embodiment of the present invention.

Referring to FIG. 5, a lithium battery according to an embodiment of the present invention is illustrated. The lithium battery 1 comprises an anode 2, a cathode 3 and a separator 4 positioned between the cathode 3 and the anode 2 to form an electrode assembly. The electrode assembly is wound and enclosed in a battery case 5. Then, the electrolyte solution is injected into the battery case 5 and the batter case is sealed with a cap 6. However, while a can-type battery of a cylindrical shape is disclosed, other types and shapes of batteries are contemplated.

The present invention will be described in more detail with reference to the following examples. However, these examples are for illustrative purposes only and are not intended to limit the scope of the present invention.

Preparation of Composite Anode Active Materials

EXAMPLE 1

1.0 g of silicon powder having an average diameter of 50 µm (Noah Technology, USA), 1.8 g of $NiAl_3$ powder (Cerac, USA), 0.2 g of artificial graphite powder, and 8 steel balls weighing 21 g were combined in a hardened steel container. The container was filled with argon and closed. The resultant mixture was then milled using a mixer (SPEX Certiprep, USA, Model No. 8000M Mixer/Mill) for 60 minutes to produce a Si/$NiAl_3$/graphite composite anode active material.

EXAMPLE 2

A composite anode active material was prepared in the same manner as in Example 1 except that 1.0 g of silicon powder having an average diameter of 50 µm (Noah Technology, USA), 1.6 g of $NiAl_3$, and 0.4 g of artificial graphite were used.

EXAMPLE 3

A composite anode active material was prepared in the same manner as in Example 1 except that 1.0 g of silicon powder having an average diameter of 100 nm (Nanostructured and Amorphous Materials, USA), 1.6 g of $NiAl_3$, and 0.4 g of artificial graphite were used.

EXAMPLE 4

A composite anode active material was prepared in the same manner as in Example 1 except that 1.0 g of silicon powder obtained by grinding the silicon powder used in Example 2 and having a diameter range from 0.5 to 5 µm, 1.6 g of $NiAl_3$, and 0.4 g of artificial graphite were used.

EXAMPLE 5

A composite anode active material was prepared in the same manner as in Example 1 except that 1.0 g of silicon powder having an average diameter of 100 nm (Nanostructured and Amorphous Materials, USA), 1.6 g of NiAl, and 0.4 g of artificial graphite powder were used.

EXAMPLE 6

A composite anode active material was prepared in the same manner as in Example 1 except that 1.0 g of silicon powder having an average diameter of 100 nm (Nanostructured and Amorphous Materials, USA), 1.6 g of $Ti_3Al$, and 0.4 g of artificial graphite powder were used.

EXAMPLE 7

A composite anode active material was prepared in the same manner as in Example 1 except that 1.0 g of silicon powder having an average diameter of 100 nm (Nanostructured and Amorphous Materials, USA), 1.6 g of TiAl, and 0.4 g of artificial graphite powder were used.

EXAMPLE 8

A composite anode active material was prepared in the same manner as in Example 1 except that 1.0 g of silicon powder having an average diameter of 100 nm (Nanostructured and Amorphous Materials, USA), 1.6 g of $TiAl_3$, and 0.4 g of artificial graphite powder were used.

REFERENCE EXAMPLE 1

1.0 g of silicon powder having an average diameter of 50 µm (Noah Technology, USA), 2.0 g of $NiAl_3$ powder, and 8 steel balls weighing 21 g were combined in a hardened steel container. The container was filled with argon and closed. The resultant mixture was then milled using a mixer (SPEX Certiprep, USA, Model No. 8000M Mixer/Mill) for 60 minutes to produce a Si/$NiAl_3$ composite anode active material.

REFERENCE EXAMPLE 2

1.0 g of $NiAl_3$, 2.0 g of artificial graphite, and 8 steel balls weighing 21 g were combined in a hardened steel container. The container was filled with argon and closed. The resultant mixture was then milled using a mixer (SPEX Certiprep, USA, Model No. 8000M Mixer/Mill) for 60 minutes to produce a $NiAl_3$/graphite composite anode active material.

REFERENCE EXAMPLE 3

1.0 g of silicon powder having an average diameter of 100 nm (Noah Technology, USA), 2.0 g of NiAl, and 8 steel balls weighing 21 g were combined in a hardened steel container. The container was filled with argon and closed. The resultant mixture was then milled using a mixer (SPEX Certiprep, USA, Model No. 8000M Mixer/Mill) for 60 minutes to produce a Si/NiAl composite anode active material.

REFERENCE EXAMPLE 4

1.0 g of NiAl, 2.0 g of artificial graphite, and 8 steel balls weighing 21 g were combined in a hardened steel container. The container was filled with argon and closed. The resultant mixture was then milled using a mixer (SPEX Certiprep, USA, Model No. 8000M Mixer/Mill) for 60 minutes to produce a NiAl/graphite composite anode active material.

COMPARATIVE EXAMPLE 1

A composite anode active material was prepared in the same manner as in Example 1 except that 1.0 g of silicon powder having an average diameter of 50 μm (Noah Technology, USA) and 2.0 g of artificial graphite were used without using $NiAl_3$.

COMPARATIVE EXAMPLE 2

A composite anode active material was prepared in the same manner as in Example 1 except that 1.0 g of silicon powder having an average diameter of 50 μm (Noah Technology, USA) and 2.0 g of $NiAl_3$ were used without using artificial graphite.

Preparation of Anode and Lithium Battery

EXAMPLE 9

0.175 g of the composite anode active material prepared in Example 1, 0.050 g of graphite powder having an average diameter of 2 μm, and 0.050 g of vinylidene fluoride (PVdF) were mixed with 1 mL N-NMP in an agate mortar to prepare a slurry. The slurry was coated on a Cu collector using a doctor blade to a thickness of about 50 μm, dried at room temperature, and then dried in vacuum at 110° C. to produce an anode plate.

A 2015-standard coin cell was manufactured using the prepared anode plate, a counter electrode made of a lithium metal, a PTFE separator, and an electrolyte solution including 1 M $LiPF_6$ melted in a mixture of EC (ethylene carbonate), DEC (diethyl carbonate) and FEC (fluoroethylene carbonate) (2:6:2 volume ratio).

EXAMPLE 10

A 2015-standard coin cell was manufactured in the same manner as in Example 9 except that the composite anode active material prepared according to Example 2 was used instead of the composite anode active material prepared according to Example 1.

EXAMPLE 11

A 2015-standard coin cell was manufactured in the same manner as in Example 9 except that the composite anode active material prepared according to Example 3 was used instead of the composite anode active material prepared according to Example 1.

EXAMPLE 12

A 2015-standard coin cell was manufactured in the same manner as in Example 9 except that the composite anode active material prepared according to Example 4 was used instead of the composite anode active material prepared according to Example 1.

EXAMPLE 13

A 2015-standard coin cell was manufactured in the same manner as in Example 9 except that the composite anode active material prepared according to Example 5 was used instead of the composite anode active material prepared according to Example 1.

EXAMPLE 14

A 2015-standard coin cell was manufactured in the same manner as in Example 9 except that the composite anode active material prepared according to Example 6 was used instead of the composite anode active material prepared according to Example 1.

EXAMPLE 15

A 2015-standard coin cell was manufactured in the same manner as in Example 9 except that the composite anode active material prepared according to Example 7 was used instead of the composite anode active material prepared according to Example 1.

EXAMPLE 16

A 2015-standard coin cell was manufactured in the same manner as in Example 9 except that the composite anode active material prepared according to Example 8 was used instead of the composite anode active material prepared according to Example 1.

REFERENCE EXAMPLE 5

A 2015-standard coin cell was manufactured in the same manner as in Example 9 except that the composite anode active material prepared according to Reference Example 2 was used instead of the composite anode active material prepared according to Example 1.

REFERENCE EXAMPLE 6

A 2015-standard coin cell was manufactured in the same manner as in Example 9 except that the composite anode active material prepared according to Reference Example 4 was used instead of the composite anode active material prepared according to Example 1.

COMPARATIVE EXAMPLE 3

A 2015-standard coin cell was manufactured in the same manner as in Example 9 except that the composite anode active material prepared according to Comparative Example 1 was used instead of the composite anode active material prepared according to Example 1.

COMPARATIVE EXAMPLE 4

A 2015-standard coin cell was manufactured in the same manner as in Example 9 except that the composite anode active material prepared according to Comparative Example 2 was used instead of the composite anode active material prepared according to Example 1.

EVALUATION EXAMPLE 1

X-ray Diffraction Experiment

Figure 1:
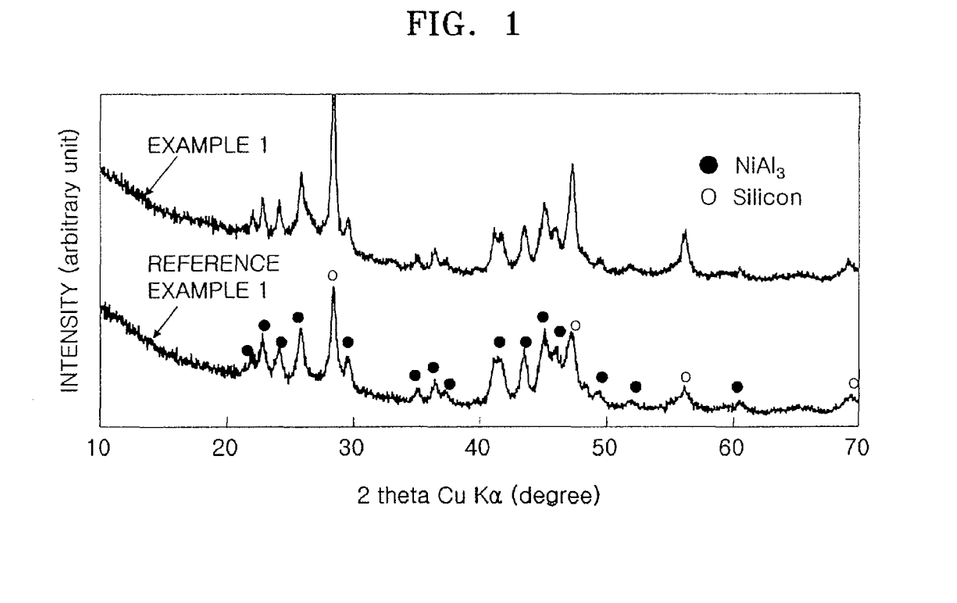
FIG. 1 depicts X-ray diffraction patterns of composite anode active material powders prepared according to Example 1 of the present invention and Reference Example 1.
Figure 2:
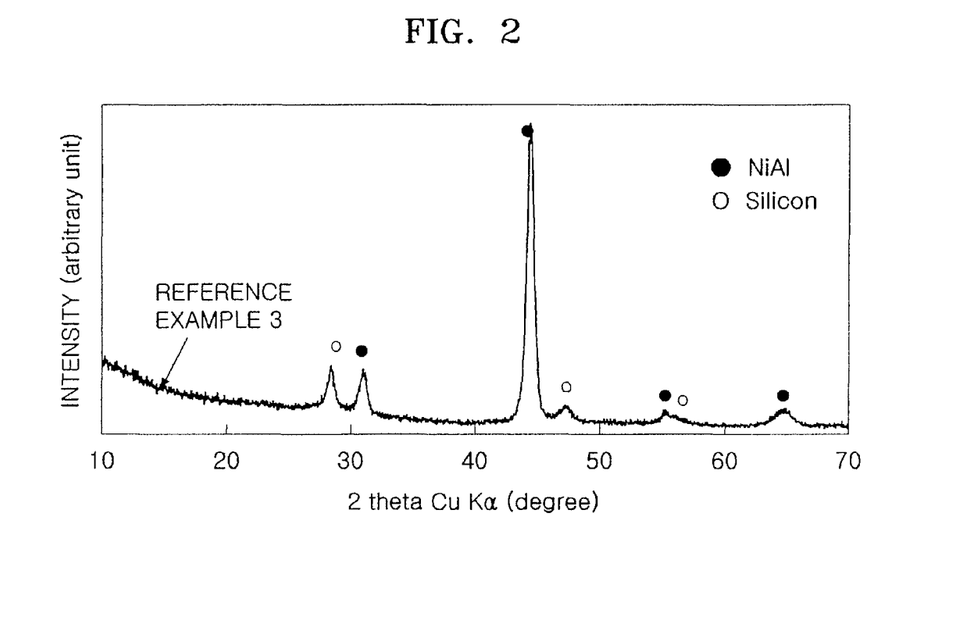
FIG. 2 depicts X-ray diffraction patterns of composite anode active material powders prepared according to Reference Example 3.

The composite anode active materials prepared according to Example 1 and Reference Examples 1 and 3 were evaluated by X-ray diffraction, and the results—are shown in FIGS. 1 and 2.

As shown in FIG. 1, in the $Si/NiAl_3$ composite prepared according to Reference Example 1, only the diffraction peaks of Si and $NiAl_3$ were detected, while the diffraction peaks of any other alloy phases that may be formed by the reaction of Si and $NiAl_3$ were not detected. This result is substantially the same as in the composite anode active material prepared according to Example 1, additionally containing a carbonaceous material, i.e., graphite, in addition to Si and NiAl$_3$. Accordingly, it is understood that NiAl$_3$ does not form an alloy phase with Si.

As shown in FIG. 2, in the Si/NiAl composite prepared according to Reference Example 3, only the diffraction peaks of Si and NiAl were detected, while the diffraction peaks of any other alloy phases that may be formed by the reaction of Si and NiAl were not detected.

EVALUATION EXAMPLE 2

Measurement of Charge and Discharge Voltage Profile

The coin cell prepared according to Reference Examples 5 and 6 was charged with a current of 100 mA with respect to 1 g of a composite anode active material to a cut-off voltage of 0.001 V (vs. Li), and discharged with the same current to a cut-off voltage of 1.5 V (vs. Li). Voltage profiles for the lithium batteries are respectively shown in FIGS. 3 and 4.

Figure 3:
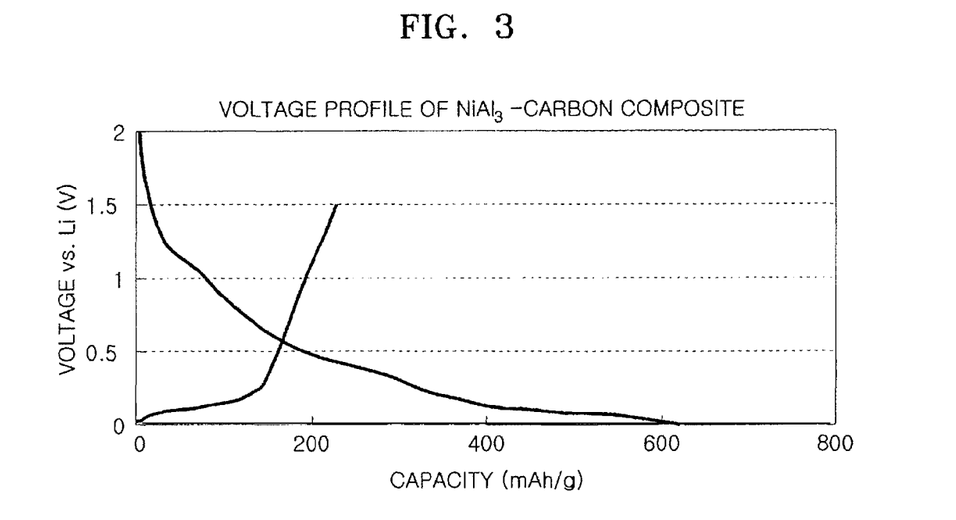
FIG. 3 depicts the voltage profile of lithium batteries prepared according to Reference Example 5.

As shown in FIG. 3, for a composite anode active material consisting of only NiAl$_3$ and a carbonaceous material, only a general discharge voltage profile of carbon having relatively poor crystallinity was shown. This is presumably because NiAl$_3$ does not form an alloy phase with lithium, and therefore, does not affect charging and discharging of the cell.

Figure 4:
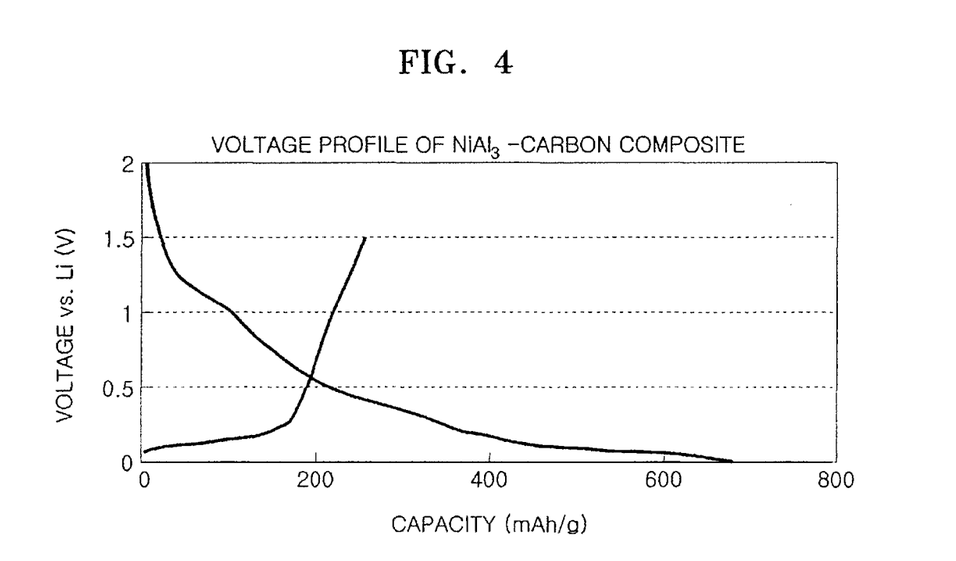
FIG. 4 depicts the voltage profile of lithium batteries prepared according to Reference Example 6.

As shown in FIG. 4, for a composite anode active material consisting of only NiAl and a carbonaceous material, only a general discharge voltage profile of carbon is shown.

EVALUATION EXAMPLE 3

Charge-Discharge Cycle Performance Test

The coin cells prepared according to Examples 9 through 16 and Comparative Examples 3 and 4 were charged with a current of 100 mA with respect to 1 g of composite anode active materials to a cut-off voltage of 0.001 V (vs. Li), and discharged with the same current to a cut-off voltage of 1.5 V (vs. Li). The discharge capacity of each battery was divided by the weight of the active material used to obtain a gravimetric specific capacity (unit: mAh/g). The capacity of each battery was divided by the volume of the anode, except for the volume of a Cu current, to obtain a volumetric specific capacity (unit: mAh/cc). Then, the discharge capacity was divided by the charge capacity to obtain an initial coulombic efficiency (%). The test results are summarized in Table 1.

TABLE 1

|  | Initial capacity Gravimetric specific capacity [mAh/g] | Initial capacity Volumetric specific capacity [mAh/cc] | Initial coulombic efficiency (%) |
| --- | --- | --- | --- |
| Example 9 | 951 | 1345 | 84.3 |
| Example 10 | 1109 | 1536 | 83.5 |
| Example 11 | 938 | 1319 | 81.5 |
| Example 12 | 1019 | 1517 | 82.2 |
| Example 13 | 1109 | 1441 | 82.5 |
| Example 14 | 985 | 1333 | 82.0 |
| Example 15 | 955 | 1362 | 82.4 |
| Example 16 | 948 | 1449 | 81.6 |
| Comparative Example 3 | 1127 | 1244 | 64.1 |
| Comparative Example 4 | 887 | 1145 | 78.4 |

As shown in Table 1, each of the lithium batteries prepared according to Examples in which composite anode active materials of the present invention were used exhibited improved initial coulombic efficiency compared to the lithium battery prepared according to Comparative Example 1 in which the composite anode active material included only graphite without NiAl$_3$. In addition, the lithium batteries prepared according to the Examples in which composite anode active materials of the present invention were used exhibited improved initial capacity compared to the lithium battery prepared according to Comparative Example 2.

The composite anode active material of the present invention includes an intermetallic compound forming an alloy phase with neither lithium nor the metal capable of alloying with lithium and existing only in phases structurally separated from the phases of the lithium and the metal capable of alloying with lithium. In an embodiment, the composite active material exhibits improved initial coulombic efficiency. In an embodiment, the anode and lithium battery including the composite anode active material of the present invention exhibit excellent charge and discharge characteristics.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A composite anode active material comprising:
    an elemental metal phase comprising a metal capable of alloying with lithium, the metal capable of alloying with lithium being selected from the group consisting of Ge Ag, Au, Pt, Mg, Sb, Pb, Bi, Zn, In, and combinations thereof;
    an intermetallic compound in a phase structurally separate from the elemental metal phase, the intermetallic compound being capable of forming one or more intermediate phases, at least one of the one or more intermediate phases comprises a compound having a composition represented by $M_xM'_y$, wherein $0<x<1$, $0<y<1$, $x+y=1$, M is selected from Ni, Ti, Co, V and Mo, and M' is Al, and wherein the intermetallic compound does not form an alloy with lithium and the metal capable of alloying with lithium; and
    a carbonaceous material.

2. The composite anode active material of claim 1, wherein at least one of the one or more intermediate phases comprises a compound selected from the group consisting of NiAl$_3$, TiAl$_3$, Co$_2$Al$_9$, CoAl$_3$, Co$_4$Al$_{13}$, VAl$_3$, V$_5$Al$_8$, MoAl$_5$ and combinations thereof.

3. The composite anode active material of claim 1, wherein the intermetallic compound comprises at least one intermediate phase selected from the group consisting of: an intermediate phase having a compound with a composition of Ni$_x$Al$_y$ where $0.37<x<0.41$ and $x+y=1$; an intermediate phase having a compound with a composition of Ni$_x$Al$_y$ where $0.45<x<0.59$ and $x+y=1$; an intermediate phase having a compound with a composition of Ni$_x$Al$_y$ where $0.64<x<0.68$ and $x+y=1$; and an intermediate phase having a compound with a composition of Ni$_x$Al$_y$ where $0.73<x<0.75$ and $x+y=1$; at 400° C.

4. The composite anode active material of claim 1, wherein the intermetallic compound comprises at least one intermediate phase selected from the group consisting of an intermediate phase having a compound with a composition of Ti$_x$Al$_y$ where $0.45<x<0.51$ and $x+y=1$; and an intermediate phase having a compound with a composition of Ti$_x$Al$_y$ where $0.65<x<0.78$ and $x+y=1$; at 500° C.

5. The composite anode active material of claim 1, wherein the intermetallic compound has the same crystal structure in an intermediate phase.

6. The composite anode active material of claim 1, wherein the carbonaceous material is at least one material selected from the group consisting of graphite, carbon black, amorphous carbon, and fibrous carbon.

7. The composite anode active material of claim 1, wherein the intermetallic compound is in an amount from 30 to 90 wt % based on the total weight of the composite anode active material.

8. The composite anode active material of claim 1, wherein the carbonaceous material is in an amount from 5 to 50 wt % based on the total weight of the composite anode active material.

9. The composite anode active material of claim 1, wherein the intermetallic compound exists only in phases structurally separated from a lithium phase and the elemental metal phase, as measured by X-ray diffraction.

10. A method of preparing a composite anode active material comprising mechanically milling in an inert atmosphere:
   an elemental metal powder comprising a metal capable of alloying with lithium, the metal capable of alloying with lithium being selected from the group consisting of Ge, Ag, Au, Pt, Mg, Sb, Pb, Bi, Zn, In, and combinations thereof;
   an intermetallic compound in a phase structurally separate from the elemental metal powder, the intermetallic compound being capable of forming one or more intermediate phases, at least one of the one or more intermediate phases comprises a compound having a composition represented by $M_xM'_y$, wherein $0<x<1$, $x+y=1$ is selected from Ni, Ti, Co, V and Mo, and M' is Al, and wherein the intermetallic compound does not form an alloy with lithium and the metal capable of alloying with lithium; and a carbonaceous material.

11. An anode comprising:
   an elemental metal phase comprising a metal capable of alloying with lithium; the metal capable of alloying with the lithium being selected from the group consisting of Ge, Au, Ag, Pt, Mb, Sb, Pb, Bi, Zn, In, and combinations thereof;
   an intermetallic compound in a phase structurally separate from the elemental metal phase, the intermetallic compound being capable of forming one or more intermediate phases, at least one of the more intermediate phases comprises a compound having a composition represented by $M_xM'_y$, wherein $0<x<1$, $0<y<1$, $x+y=1$, M is selected from Ni, Ti, Co, V and Mo, and M' is Al, and wherein the intermetallic compound does not form an alloy with lithium and the metal capable of alloying with lithium;
   a carbonaceous material; and
   a binder.

12. A lithium battery comprising an anode, a cathode, and an electrolyte, wherein the anode comprises:
   an elemental metal phase comprising a metal capable of alloying with lithium, the metal capable of alloying with lithium being selected from the group consisting of Ge, Au, Ag, Pt, Mg, Sb, Pb, Bi, Sn, In, and combinations thereof;
   an intermetallic compound in a phase structurally separate from the metal capable of alloying with lithium, the intermetallic compound being capable of forming one or more intermediate phases, at least one of the one or more intermediate phases comprises a compound having a composition represented by $M_xM'_y$, wherein $0<x<1$, $0<y<1$, $x+y=1$, M is selected from Ni, Ti, Co, V and Mo, and M' is Al, and wherein the intermetallic compound does not form an alloy with lithium and the metal capable of alloying with lithium; and
   a carbonaceous material.

13. A composite anode active material comprising:
   an elemental metal phase comprising a metal capable of alloying with lithium, the metal capable of alloying with lithium being selected from the group consisting of Si, Ge, Ag, Au, Pt, Mg, Sb, Pb, Bi, Zn, In, and combinations thereof;
   an intermetallic compound in a phase structurally separate from the elemental metal phase, the intermetallic compound comprising a material capable of forming one or more intermediate phases, at least one of the intermediate phases comprising a material selected from the group consisting of $Co_2Al_9$, $CoAl_3$, $Co_4Al_{13}$, $MoAl_5$ and combinations thereof, wherein the intermetallic compound does not form an alloy with lithium and the metal capable of alloying with lithium; and
   a carbonaceous material.

* * * * *